(12) United States Patent
Mori

(10) Patent No.: US 10,301,485 B2
(45) Date of Patent: May 28, 2019

(54) COATING COMPOSITION AND OPTICAL ARTICLE HAVING A COAT LAYER MADE OF THE COATING COMPOSITION

(71) Applicant: TOKUYAMA CORPORATION, Shunan-shi, Yamaguchi (JP)

(72) Inventor: Katsuhiro Mori, Shunan (JP)

(73) Assignee: TOKUYAMA CORPORATION, Shunan-Shi, Yamaguchi (JP)

( * ) Notice: Subject to any disclaimer, the term of this patent is extended or adjusted under 35 U.S.C. 154(b) by 251 days.

(21) Appl. No.: 15/518,823

(22) PCT Filed: Dec. 2, 2015

(86) PCT No.: PCT/JP2015/084458
§ 371 (c)(1),
(2) Date: Apr. 13, 2017

(87) PCT Pub. No.: WO2016/088901
PCT Pub. Date: Jun. 9, 2016

(65) Prior Publication Data
US 2017/0240769 A1    Aug. 24, 2017

(30) Foreign Application Priority Data
Dec. 4, 2014 (JP) ................................ 2014-245502

(51) Int. Cl.
| | | |
|---|---|---|
| *C09D 7/40* | (2018.01) | |
| *C09D 183/04* | (2006.01) | |
| *C09D 183/06* | (2006.01) | |
| *C08K 5/053* | (2006.01) | |
| *C08K 5/06* | (2006.01) | |
| *C08K 5/103* | (2006.01) | |
| *G02B 5/23* | (2006.01) | |
| *G02C 7/02* | (2006.01) | |
| *G02C 7/10* | (2006.01) | |
| *G02B 1/14* | (2015.01) | |
| *C09D 7/61* | (2018.01) | |
| *G02B 5/22* | (2006.01) | |
| *C08K 3/22* | (2006.01) | |
| *C08G 77/50* | (2006.01) | |
| *G02B 5/20* | (2006.01) | |

(52) U.S. Cl.
CPC .............. *C09D 7/40* (2018.01); *C08K 5/053* (2013.01); *C08K 5/06* (2013.01); *C08K 5/103* (2013.01); *C09D 7/61* (2018.01); *C09D 183/04* (2013.01); *C09D 183/06* (2013.01); *G02B 1/14* (2015.01); *G02B 5/223* (2013.01); *G02B 5/23* (2013.01); *G02C 7/02* (2013.01); *G02C 7/10* (2013.01); *G02C 7/102* (2013.01); *C08G 77/50* (2013.01); *C08K 3/22* (2013.01); *C08K 2003/2237* (2013.01); *G02B 5/206* (2013.01); *G02B 5/208* (2013.01); *G02B 2207/109* (2013.01); *G02C 2202/16* (2013.01)

(58) Field of Classification Search
CPC ........................................................ G02B 1/14
USPC .............. 106/287.13, 287.14, 287.16, 287.2, 106/287.22
See application file for complete search history.

(56) References Cited

U.S. PATENT DOCUMENTS

| | | | | |
|---|---|---|---|---|
| 4,211,823 A | | 7/1980 | Suzuki et al. | |
| 5,367,019 A | * | 11/1994 | Sawaragi ............... | C08K 5/092 106/287.13 |
| 6,342,097 B1 | * | 1/2002 | Terry ..................... | C09D 183/06 106/287.13 |
| 2006/0225613 A1 | * | 10/2006 | Lejeune ................ | C08G 77/14 106/287.16 |

FOREIGN PATENT DOCUMENTS

| | | |
|---|---|---|
| EP | 0 763 581 A2 | 3/1997 |
| JP | 57-2735 B2 | 1/1982 |
| JP | 5-264805 A | 10/1993 |
| JP | 9-78027 A | 3/1997 |
| JP | 11-310755 A | 11/1999 |
| JP | 2006-70078 A | 3/2006 |
| JP | 2006-264109 A | 10/2006 |
| JP | 2008-96886 A | 4/2008 |
| JP | 2009-244865 A | 10/2009 |
| JP | 2011-84677 A | 4/2011 |
| JP | 2011-123270 A | 6/2011 |

OTHER PUBLICATIONS

Machine translation of JP 2008-096886 (no date).*
Machine translation of JP 2011-084677 (no date).*
Extended European Search Report dated Jun. 1, 2018 for Application No. 15865188.5.
International Search Report for PCT/JP2015/084458 dated Mar. 8, 2016.
Written Opinion of the International Searching Authority for PCT/JP2015/084458 (PCT/ISA/237) dated Mar. 8, 2016.
International Preliminary Report on Patentability and English translation of the Written Opinion of the International Searching Authority (Forms PCT/IB/338, PCT/IB/373 and PCT/ISA/237), dated Jun. 15, 2017, for International Application No. PCT/JP2015/084458.

* cited by examiner

*Primary Examiner* — Marc S Zimmer
(74) *Attorney, Agent, or Firm* — Birch, Stewart, Kolasch & Birch, LLP

(57) ABSTRACT

A coating composition comprising inorganic oxide fine particles containing at least one element selected from the group consisting of Ti, Zr, Sn and Sb, a hydrolysable group-containing organic silicon compound, and (C1) a surfactant having an HLB value of 8 or less and (C2) a surfactant having an HLB value of more than 8, for forming a coat layer having little white turbidity, a good appearance and excellent scratch resistance, chemical resistance, hot water resistance and weather resistance on the surface of a plastic optical substrate.

20 Claims, No Drawings

COATING COMPOSITION AND OPTICAL ARTICLE HAVING A COAT LAYER MADE OF THE COATING COMPOSITION

TECHNICAL FIELD

The present invention relates to a novel coating composition and a novel laminate having a hard coat layer (cured product layer) formed from the coating composition. More specifically, it relates to a coating composition for forming the most suitable hard coat layer on the surface of a high refractive index resin substrate (lens) having a refractive index of more than 1.50 or the surface of a photochromic optical substrate such as a photochromic plastic lens.

BACKGROUND ART

Plastic lenses have characteristic properties that glass lenses do not have, such as lightweight, safety, high workability and fashionability, and are now mainstream in the spectacle lens field. However, for example, diethylene glycol bisallyl carbonate resin lenses which are commonly used have a refractive index of 1.50 which is lower than that of glass and become thick at the periphery. Therefore, in the field of resin lenses, a synthetic resin lens having a higher refractive index is used to reduce the thickness.

Meanwhile, as plastic lenses have a disadvantage that they are easily scratched, a silicone-based hard coat layer is formed on the surface to improve the disadvantage. This silicone-based coat layer is formed by preparing a coating composition comprising silica fine particles, an organic silicon compound having a hydrolysable group, a curing catalyst, an acid aqueous solution and a water-soluble solvent as main components (may be referred to as "low refractive index coating composition" which comprises silica fine particles hereinafter), applying the coating composition to the surface of a plastic lens, and heating to cure the coating film and evaporate the contained solvent (refer to JP-B 57-2735).

However, when a hard coat layer is formed on a high refractive index plastic lens having a refractive index of 1.60 or more by using the above low refractive index coating composition, an interference fringe is produced due to the difference in refractive index between the plastic lens and the hard coat layer, resulting in a poor appearance.

To solve this problem, various studies are now under way. For example, there is known a coating composition comprising a composite metal oxide containing Sb, Ti, Zr or Sn having a high refractive index in place of the silica fine particles which are one of the components of the coating composition (JP-A 5-264805). This coating composition can be advantageously used for high refractive index plastic lenses. However, since a hard coat layer formed from a coating composition comprising titanium oxide deteriorates due to the photocatalytic activity of titanium oxide, there is room for the improvement of weather resistance. Therefore, a high refractive index coating composition comprising rutile type titanium oxide has been developed to reduce the photocatalytic activity of this titanium oxide (refer to JP-A 11-310755).

Although the above weather resistance is improved by the above high refractive index coating composition comprising rutile type titanium oxide, it was found through studies conducted by the inventors of the present invention that a hard coat layer obtained from the above coating composition becomes clouded, resulting in a poor appearance.

Further, performance required for the hard coat layer is becoming higher and a coating composition having the following performance in addition to the above performance is desired. Stated more specifically, an antireflection film may be formed on a hard coat layer formed from the coating composition to enhance the function of a plastic lens, and the alkali cleaning of the lens may be carried out before the formation of this antireflection film. Therefore, the lens having a hard coat layer must have such performance that the hard coat layer hardly peels off by alkali cleaning (this performance may be referred to as "chemical resistance" hereinafter).

Further, there is a case where a plastic lens comes into contact with hot water according to its application purpose. Even in this case, performance that the hard coat layer does not crack is required (this performance may be referred to as "hot water resistance" hereinafter).

Moreover, when a plastic lens expands by heat, performance that the hard coat layer can follow this expansion and does not crack is required (this performance may be referred to as "heat resistance" hereinafter). Especially heat resistance is required for the hard coat layer formed as described above and also when the hard coat layer is to be formed. That is, when the hard coat layer is formed on a plastic lens, heating is required to cure the coating composition. At this point, there is a case where the hard coat layer cracks due to the shrinkage of the hard coat layer and the expansion of the plastic lens by heating. Therefore, this cracking must be suppressed. Further, at the time of processing based on the specifications of a plastic lens, a coating composition having excellent moldability is desired.

DISCLOSURE OF THE INVENTION

It is therefore an object of the present invention to provide a coating composition capable of forming a hard coat layer which is rarely clouded, does not peel off due to cracking even when it is used for a long period of time and has excellent adhesion to an optical substrate such as a plastic lens and high chemical resistance, hot water resistance and heat resistance, especially heat resistance at the time of forming a hard coat layer.

It is another object of the present invention to provide an optical article having a hard coat layer obtained from the above coating composition.

Other objects and advantages of the present invention will become apparent from the following description.

The inventors of the present invention conducted intensive studies to solve the above problems. When they investigated the cause of producing white turbidity in the hard coat layer, they found that there is a case where white turbidity is produced in a coating composition or a case where white turbidity is produced when a hard coat layer is formed though white turbidity is not produced in a coating composition and further that white turbidity is produced even in a coating composition comprising inorganic oxide particles containing rutile type titanium oxide, or Sb, Zr or Sn without containing rutile type titanium oxide. They found that this phenomenon can be resolved by using specific surfactants in a coating composition comprising inorganic oxide fine particles containing an oxide of a metal such as Ti, Zr, Sn or Sb for use in a high-refractive index coating composition and a hydrolysable group-containing organic silicon compound to improve the dispersion stability in the coating composition of the inorganic oxide fine particles. The present invention was accomplished based on this finding.

That is, the present invention is a coating composition comprising (A) inorganic oxide fine particles containing at least one element selected from the group consisting of Ti, Zr, Sn and Sb, (B) a hydrolysable group-containing organic silicon compound, and (C1) a surfactant having an HLB value of 8 or less and (C2) a surfactant having an HLB value of more than 8 as surfactants (C).

In the coating composition of the present invention, the above inorganic oxide fine particles preferably contain titanium oxide having a rutile type crystal structure.

In the present invention, the above hydrolysable group-containing organic silicon compound (B) preferably contains (B1) a disilane compound represented by the following formula (1).

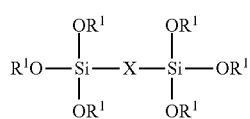

(1)

wherein, $R^1$ is a methyl group or ethyl group, and X is an alkylene group having 2 to 3 carbon atoms.

According to the present invention, there is provided an optical article having a hard coat layer which is a cured product of the above coating composition on a plastic optical substrate. In the invention of the above optical article, when the above plastic optical substrate is a photochromic optical substrate, the optical article exhibits an excellent effect. Especially when the above photochromic optical substrate has a photochromic coat layer which is a cured product of a polymerization curable composition comprising polymerizable monomers and a photochromic compound on a plastic optical substrate and a hard coat layer on the photochromic coat layer, the optical article exhibits an especially excellent effect.

When the above plastic optical substrate is an optical substrate containing a dye, this optical article exhibits an excellent effect as well.

BEST MODE FOR CARRYING OUT THE INVENTION

The coating composition of the present invention comprises (A) inorganic oxide fine particles and (B) a hydrolysable group-containing organic silicon compound, the above inorganic oxide fine particles (A) are inorganic oxide fine particles containing at least one element selected from the group consisting of Ti, Zr, Sn and Sb, and the coating composition further comprises (C1) a surfactant having an HLB value of 8 or less and (C2) a surfactant having an HLB value of more than 8 as (C) surfactants. By using a combination of the surfactant having an HLB value of 8 or less and the surfactant having an HLB value of more than 8, it is possible to suppress the white turbidity of the obtained hard coat layer.

The reason that the coating composition of the present invention exhibits the above excellent effect is not known but the inventors of the present invention consider as follows.

That is, when the surfactant having an HLB value of 8 or less is added to the coating composition, coatability to an optical article such as a plastic lens improves but white turbidity increases. It is considered that this is because the surfactant having an HLB value of 8 or less has high lipophilicity, whereby the dispersion stability of the inorganic oxide fine particles is impaired and therefore the inorganic oxide fine particles are apt to agglomerate. On the other hand, the surfactant having an HLB value of more than 8 has high hydrophilicity and high dispersion stability for inorganic oxide fine particles, thereby making it possible to suppress the white turbidity of the hard coat layer. However, the surfactant has poor coatability to an optical article such as a plastic lens, thereby causing a poor appearance.

Then, use of both the surfactant having an HLB value of 8 or less and the surfactant having an HLB value of more than 8 makes it possible to suppress the white turbidity of the hard coat layer and to achieve the transparency of the hard coat layer and coatability to an optical article such as a plastic lens at the same time. Especially when the inorganic oxide fine particles contain titanium oxide having a rutile type crystal structure, surprisingly, an effect obtained by using these two surfactants becomes remarkable.

Further, by using the disilane compound (B1) as the hydrolysable group-containing organic silicon compound, a coat layer having excellent chemical resistance, especially alkali resistance, flexibility, high hot water resistance and excellent heat resistance without impairing hardness can be formed as the disilane compound (B1) has a part bonded to a silicon atom by hydrocarbon in place of a siloxane bond.

Further, by using the disilane compound, adhesion at the interface between the hard coat layer and the plastic optical substrate is improved.

A description is subsequently given of each of the components constituting the coating composition of the present invention.

<Inorganic Oxide Fine Particles (A) Containing at Least One Element Selected from the Group Consisting of Ti, Zr, Sn and Sb>

The inorganic oxide fine particles containing at least one element selected from the group consisting of Ti, Zr, Sn and Sb in the present invention (may be simply referred to as "inorganic oxide fine particles" hereinafter) are oxide fine particles containing an oxide of at least one element selected from the group consisting of Ti, Zr, Sn and Sb. The above inorganic oxide fine particles should contain at least one oxide of an element (s) selected from the group of the above elements. That is, composite oxide fine particles containing one oxide of the above elements or the above elements may be used, or a mixture of a plurality of the above inorganic oxide fine particles may be used.

Since the refractive index of the finally formed hard coat layer can be increased by using the above inorganic oxide fine particles, when the obtained coating composition is applied to an optical article such as a plastic lens having a high refractive index, an interference fringe can be reduced. Oxide fine particles containing Ti oxide are preferred as they have the great effect of improving the refractive index of a hard coat layer. Inorganic oxide fine particles containing rutile type titanium oxide having low photocatalytic activity are particularly preferred as they can provide a hard coat layer having a high refractive index and excellent weather-resistant adhesion.

The inorganic oxide fine particles of the present invention are not particularly limited if they contain an oxide of at least one element selected from the group consisting of Ti, Zr, Sn and Sb, and may contain an oxide of an element selected from Si, Al, Fe, In, Ce and W except for the above elements or a composite oxide containing these elements.

When composite oxide fine particles are used as the inorganic oxide fine particles in the present invention, the amount of each oxide may be suitably determined according to use purpose. From the viewpoint of the refractive index and weather-resistant adhesion of the obtained hard coat layer, as for the blending ratio of the components when the composite inorganic oxide fine particles are used as the inorganic oxide fine particles, preferably, the content of tin oxide is 5.0 to 90.0 mass %, the content of zirconium oxide is 5.0 to 90.0 mass %, the content of antimony pentoxide is 0.0 to 30.0 mass %, the content of silicon dioxide is 0.0 to 30.0 mass % and the content of titanium oxide is 0.0 to 80.0 mass %. Particularly preferably, the content of tin oxide is 10.0 to 85.0 mass %, the content of zirconium oxide is 5.0 to 20.0 mass %, the content of antimony pentoxide is 0.0 to 10.0 mass %, the content of silicon dioxide is 1.0 to 20.0 mass % and the content of titanium oxide is 0.0 to 70.0 mass %.

In the present invention, the above inorganic oxide fine particles contained in the coating composition are used in the form of sol which is prepared by colloidally dispersing in water or an organic solvent as a dispersion medium from the viewpoint of dispersion stability.

Examples of the organic solvent used as the dispersion medium for the inorganic oxide fine particles in the present invention include alcohols such as n-butanol, 2-butanol, t-butanol, isopropanol, ethanol, methanol and ethylene glycol; cellosolves such as propylene glycol monomethyl ether, propylene glycol monomethyl ether acetate, ethylene glycol monomethyl ether and ethylene glycol monoethyl ether; and methyl ethyl ketone, methyl isobutyl ketone and dimethyl acetamide. These organic solvents may be used alone or as a mixture of two or more or a mixture of an organic solvent and water. Out of the above dispersion media, water, an alcohol or a mixed solvent of water and an alcohol is preferably used.

When the above dispersion medium is used, the concentration of a solid component contained in the inorganic oxide fine particle sol, that is, the concentration of the inorganic oxide fine particles contained in the sol is preferably 10 to 50 mass % in consideration of operability.

The inorganic oxide fine particles in the present invention preferably have a primary particle diameter of 1 to 300 nm when they are observed through an electron microscope (TEM). As will be described hereinafter, multiple types of inorganic oxide fine particles may be used as the inorganic oxide fine particles in the present invention. Even in this case, the primary particle diameter of all the inorganic oxide fine particles is preferably 1 to 300 nm.

The amount of the inorganic oxide fine particles in the coating composition of the present invention is preferably 20.0 to 60.0 parts by mass, particularly preferably 30.0 to 50.0 parts by mass based on 100 parts by mass of the total of the inorganic oxide fine particles and the hydrolysable group-containing organic silicon compound (B) which will be described hereinafter, from the viewpoints of the hardness, heat resistance and flexibility of the obtained hard coat layer. This amount is the amount of a solid component excluding the dispersion medium, that is, the amount of the inorganic oxide fine particles.

In general, the amounts of the other components should be determined to ensure that the content of the inorganic oxide fine particles in the finally formed hard coat layer becomes 30 to 70 mass %, preferably 40 to 60 mass %. The mass of the hard coat layer can be obtained by weighing the mass of a solid component left behind after the following hydrolysable group-containing organic silicon compound is hydrolyzed and the obtained coating composition is heated at 120° C. for 3 hours.

The inorganic oxide fine particles containing at least one element selected from the group consisting of Ti, Zr, Sn and Sb in the present invention can be acquired as a commercial product. Examples of the commercial product include the AMT series, HX series, HZ series, HIT series and HT series of Nissan Chemical Industries, Ltd. Inorganic oxide fine particles other than the above inorganic oxide fine particles can be acquired as a commercial product. Examples of the commercial product include silica sols containing water as a dispersion medium such as SNOWTEX OXS, SNOWTEX OS, SNOWTEX O and SNOWTEX O-40 and silica sols containing an alcohol as a dispersion medium such as MA-ST-MS (dispersion medium; methanol) and IPA-ST (dispersion medium; isopropanol) all of which are silica fine particles marketed by Nissan Chemical Industries, Ltd.

A description is subsequently given of the hydrolysable group-containing organic silicon compound (B).

<Hydrolysable Group-Containing Organic Silicon Compound (B)>

The hydrolysable group-containing organic silicon compound in the present invention is a component which forms a transparent cured body as a matrix when the coating composition is cured to form a hard coat layer and serves as a binder for the above inorganic oxide fine particles.

In the present invention, the amount of the hydrolysable group-containing organic silicon compound (B) is preferably 40.0 to 80.0 parts by mass based on 100 parts by mass of the total of the hydrolysable group-containing organic silicon compound (B) and the above inorganic oxide fine particles (A). The amount of the hydrolysable group-containing organic silicon compound (B) is the amount of the hydrolysable group-containing organic silicon compound which is not hydrolyzed. When the amount of the hydrolysable group-containing organic silicon compound is small, the heat resistance and flexibility of the hard coat layer tend to degrade and the hard coat layer itself tends to become brittle. When the amount of the hydrolysable group-containing organic silicon compound is large, the hardness of the hard coat layer tends to lower. When the hardness, heat resistance and flexibility of the obtained hard coat layer are taken into consideration, the amount of the hydrolysable group-containing organic silicon compound is particularly preferably 50.0 to 70.0 parts by mass based on 100 parts by mass of the hydrolysable group-containing organic silicon compound and the above inorganic oxide fine particles (A).

Any known hydrolysable group-containing organic silicon compound may be used as the hydrolysable group-containing organic silicon compound of the present invention. However, from the viewpoints of the high scratch resistance, heat resistance, chemical resistance and hot water resistance of the obtained hard coat layer, it is preferably selected from a disilane compound and an epoxy group-containing hydrolysable organic silicon compound which will be described hereinafter. A disilane compound (B1) represented by the following formula (1) is particularly preferably used.

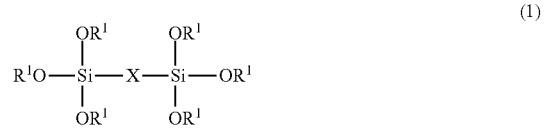

(1)

wherein, $R^1$ is a methyl group or ethyl group, and X is an alkylene group having 2 to 3 carbon atoms.

A description is subsequently given of the above disilane compound.

<Disilane Compound (B1) Represented by the Above Formula (1)>

In the present invention, the above component (B) preferably contains (B1) a disilane compound represented by the above formula (1) (to be simply referred to as "disilane compound" hereinafter). When the component (B) contains this disilane compound (B1), the scratch resistance, heat resistance, chemical resistance and hot water resistance of the obtained hard coat layer can be improved and further adhesion at the interface between the hard coat layer and the plastic optical substrate can be improved, thereby making it possible to improve weather-resistant adhesion as well.

In the above formula (1), $R^1$ is a methyl group or ethyl group. X is an alkylene group having 2 to 3 carbon atoms. When the number of carbon atoms is more than 3, the hardness of the hard coat layer degrades and the scratch resistance deteriorates disadvantageously though the obtained hard coat layer has excellent chemical resistance, hot water resistance and heat resistance. To obtain satisfactory chemical resistance, hot water resistance, heat resistance, scratch resistance and weather-resistant adhesion, X is preferably an ethylene group.

Examples of this disilane compound (B1) include 1,2-bis(triethoxysilyl)ethane and 1,2-bis(trimethoxysilyl)ethane, out of which 1,2-bis(triethoxysilyl)ethane is particularly preferred.

The amount of this disilane compound (B1) is preferably 3.5 to 25.0 parts by mass based on 100 parts by mass of the total of the above inorganic oxide fine particles (A) (solid component in sol when the inorganic oxide fine particle sol is used) and the above hydrolysable group-containing organic silicon compound (B). The amount of this disilane compound is the amount of the disilane compound which is not hydrolyzed. When the amount of the disilane compound is small, the effect of improving chemical resistance and weather-resistant adhesion tends to lower and cracking tends to occur due to heat history at the time of curing. When the amount of the disilane compound is large, scratch resistance tends to degrade. When the physical properties of the obtained hard coat layer and the moldability of the hard coat layer are taken into consideration, the amount of the disilane compound is particularly preferably 7.0 to 18.0 parts by mass based on the same standard as above.

The above disilane compound is included in the above hydrolysable group-containing organic silicon compound. Therefore, for example, when the amount of the component (B) is 40.0 to 80.0 parts by weight and the amount of the disilane compound (B1) is 3.5 to 25.0 parts by mass based on 100 parts by mass of the total of the inorganic oxide fine particles (A) and the hydrolysable group-containing organic silicon compound (B), a hydrolysable group-containing organic silicon compound except for the disilane compound (B1) may be contained in an amount of 15.0 to 76.5 parts by mass. Similarly, when the amounts of the inorganic oxide fine particles and the hydrolysable group-containing organic silicon compound fall within the above ranges and the amount of the disilane compound (B1) is 5.0 to 20.0 parts by mass, a hydrolysable group-containing organic silicon compound except for the disilane compound (B1) may be contained in an amount of 20.0 to 75.0 parts by mass. The amount of the hydrolysable group-containing organic silicon compound except for the disilane compound (B1) is the amount of the hydrolysable group-containing organic silicon compound which is not hydrolyzed as described above.

A description is subsequently given of the hydrolysable group-containing organic silicon compound except for the disilane compound (B1).

<Hydrolysable Group-Containing Organic Silicon Compound Except for Disilane Compound (B1)>

A known hydrolysable group-containing organic silicon compound which is used for a coating composition may be used as the hydrolysable group-containing organic silicon compound except for the disilane compound (B1) in the hydrolysable group-containing organic silicon compound of the present invention. To improve the adhesion and further chemical resistance, heat resistance and hardness of the hard coat layer to be formed, (B2) an epoxy group-containing organic silicon compound represented by the following formula (2) is preferably used.

$$(R^2)Si(OR^3)_3 \quad (2)$$

wherein, $R^2$ is a group represented by the following formula (3):

wherein, $R^4$ is an alkylene group having 1 to 8 carbon atoms or a group represented by the following formula (4):

wherein, $R^5$ is an alkylene group having 1 to 8 carbon atoms and $R^3$'s are each an alkyl group having 1 to 3 carbon atoms and may be the same or different.

Preferably, (B3) an epoxy group-containing organic silicon compound represented by the following formula (5) is further used in addition to the above epoxy group-containing organic silicon compound (B2).

$$(R^2)(R^6)Si(OR^3)_2 \quad (5)$$

wherein, $R^6$ is an alkyl group having 1 to 3 carbon atoms, and $R^2$ and $R^3$ are as defined in the above formula (2).

Examples of the epoxy group-containing organic silicon compound (B2) represented by the above formula (2) include γ-glycidoxypropyl trimethoxysilane, γ-glycidoxypropyl triethoxysilane, 5,6-epoxyhexyl triethoxysilane and β-3,4-epoxycyclohexyl)ethyl trimethoxysilane. Out of these, γ-glycidoxypropyl trimethoxysilane is particularly preferred.

Examples of the epoxy group-containing organic silicon compound (B3) represented by the above formula (5) include γ-glycidoxypropylmethyl dimethoxysilane and γ-glycidoxypropylmethyl diethoxysilane. Out of these, γ-glycidoxypropylmethyl dimethoxysilane is particularly preferred.

<Amounts of Disilane Compound (B1) and Epoxy Group-Containing Organic Silicon Compounds (B2) and (B3)>

The amounts of the above epoxy group-containing organic silicon compounds (B2) and (B3) are suitably determined according to the amounts of the hydrolysable group-containing organic silicon compound (B) and the disilane compound (B1) as described above. That is, the total amount of the components (B1) to (B3) is the same or smaller than the amount of the component (B) contained in the coating composition of the present invention.

The above epoxy group-containing organic silicon compounds (B2) and (B3) are included in the above hydrolysable group-containing organic silicon compound. Therefore, for example, when the amount of the component (B) is 40.0 to 80.0 parts by mass and the amount of the above disilane compound (B1) is 3.5 to 25.0 parts by mass based on 100 parts by mass of the total of the inorganic oxide fine particles (A) and the hydrolysable group-containing organic silicon compound (B), the epoxy group-containing organic silicon compounds (B2) and (B3) may be contained in a total amount of 15.0 to 76.5 parts by mass. Similarly, when the amounts of the inorganic oxide fine particles and the hydrolysable group-containing organic silicon compound fall within the above ranges and the amount of the disilane compound (B1) is 5.0 to 20.0 parts by mass, the epoxy group-containing organic silicon compounds (B2) and (B3) may be contained in a total amount of 20.0 to 75.0 parts by mass.

The amounts of the epoxy group-containing organic silicon compounds (B2) and (B3) are the amounts of the hydrolysable group-containing organic silicon compounds which are not hydrolyzed as described above.

From the viewpoints of the hardness, heat resistance and hot water resistance of the hard coat layer, preferably, the component (B2) is contained in an amount of 2.5 to 20 moles and the component (B3) is contained in an amount of 0 to 3 moles based on 1 mole of the component (B1). The amount of the component (B2) is preferably 2.5 to 15 moles, more preferably 2.5 to 10 moles and the amount of the component (B3) is preferably 0 to 2.5 moles, more preferably 0 to 2 moles.

Further, from the viewpoint of adhesion, within the above ranges, the total amount of the components (B2) and (B3) is preferably not less than 3 moles, more preferably not less than 4 moles, much more preferably not less than 5 moles, particularly preferably not less than 6 moles based on 1 mole of the component (B1). The upper limit of the total amount of the components (B2) and (B3) is suitably determined within a range that ensures that the amounts of the components (B2) and (B3) fall within the above ranges, preferably not more than 20 moles, more preferably not more than 15 moles, most preferably not more than 12 moles from the viewpoint of alkali resistance.

That is, the total amount of the components (B2) and (B3) is preferably 3 to 20 moles, more preferably 4 to 15 moles, particularly preferably 6 to 12 moles based on 1 mole of the component (B1).

As described above, when the total amount of the components (B1) and (B2) or (B3) is smaller than the amount of the hydrolysable group-containing organic silicon compound (B), another hydrolysable group-containing organic silicon compound except for the components (B1), (B2) and (B3) may further be blended. A description is subsequently given of this organic silicon compound.

<Hydrolysable Group-Containing Organic Silicon Compound Except for (B1), (B2) and (B3)>

A known hydrolysable group-containing organic silicon compound which can be used for a coating composition may be used as the above hydrolysable group-containing organic silicon compound except for the components (B1) to (B3). Examples of this hydrolysable group-containing organic silicon compound include tetraethoxysilane, vinyl trimethoxysilane, vinyl triethoxysilane, vinyl triacetoxysilane, methyl trimethoxysilane, methyl triethoxysilane, methyl triphenoxysilane, dimethyl dimethoxysilane, trimethyl methoxysilane, phenyl trimethoxysilane, diphenyl dimethoxysilane, cyclohexylmethyl dimethoxysilane, n-propyl trimethoxysilane, n-butyl trimethoxysilane, isobutyl trimethoxysilane, isobutyl triethoxysilane, n-hexyl trimethoxysilane, n-hexyl triethoxysilane, n-octyl triethoxysilane, n-decyl trimethoxysilane, 3-ureidopropyl triethoxysilane, trifluoropropyl trimethoxysilane, perfluorooctylethyl triethoxysilane, γ-chloropropyl trimethoxysilane, vinyl tri(β-methoxy-ethoxy)silane, allyl trimethoxysilane, γ-acryloxypropyl trimethoxysilane, γ-acryloxypropyl triethoxysilane, γ-methacryloxypropyl trimethoxysilane, γ-methacryloxypropyl triethoxysilane, γ-methacryloxypropyl dimethoxymethylsilane, γ-mercaptopropyl trialkoxysilane, γ-aminopropyl trimethoxysilane, γ-aminopropyl triethoxysilane, N-phenyl-γ-aminopropyl trimethoxysilane, 3-triethoxysilyl-N-(1,3-dimethyl-butylidene)propylamine, N-2 (aminoethyl)3-aminopropyl triethoxysilane, N-2 (aminoethyl)3-aminopropyl trimethoxysilane, N-2 (aminoethyl)3-aminopropylmethyl dimethoxysilane, p-styryl trimethoxysilane and 3-isocyanatepropyl triethoxysilane.

The amount of the other hydrolysable group-containing organic silicon compound is suitably determined according to the amounts of the hydrolysable group-containing organic silicon compound (B), the disilane compound (B1) and the epoxy group-containing organic silicon compound ((B2) or (B3)) To improve operability and obtain an excellent coat layer, the component (B) preferably consists of the components (B1), (B2) and (B3).

A description is subsequently given of the surfactants (C)

<Surfactants (C)>

The most significant feature of the coating composition of the present invention is that it comprises the above inorganic oxide fine particles (A), the hydrolysable group-containing organic silicon compound (B) and further (C1) a surfactant having an HLB value of 8 or less and (C2) a surfactant having an HLB value of more than 8 as surfactants (C). By blending the above surfactants, coatability to an optical substrate is improved when the coating composition is applied to a plastic optical substrate, a hard coat layer having uniform film thickness and high smoothness can be formed, and the white turbidity of the hard coat layer can be suppressed.

As the surfactants in the present invention, nonionic, anionic and cationic surfactants may be used but a nonionic surfactant is preferably used from the viewpoint of wettability to a plastic lens substrate. Preferred examples of the nonionic surfactant include sorbitan fatty acid esters, glycerin fatty acid esters, decaglycerin fatty acid esters, propylene glycol.pentaerythritol fatty acid esters, polyoxyethylene sorbitan fatty acid esters, polyoxyethylene sorbit fatty acid esters, polyoxyethylene glycerin fatty acid esters, polyethylene glycol fatty acid esters, polyether modified silicone oil, polyoxyethylene alkyl ethers, polyoxyethylene phytosterole.phytostanol, polyoxyethylene polyoxypropylene alkyl ethers, polyoxyethylene alkylphenyl ethers, polyoxyethylene castor oil.hardened castor oil, polyoxyethylene lanoline.lanoline alcohol.beeswax derivatives, polyoxyethylene alkylamine.fatty acid amides, polyoxyethylene alkylphenyl formaldehyde condensates and single-chain polyoxyethylene alkyl ethers.

Surfactants having an HLB value within a predetermined range should be selected from the above surfactants. As the surfactant having an HLB value of 8 or less (C1), a surfactant having an HLB value of 3 to 7, specifically 4 to 6 is preferably used to improve the leveling property of the coating composition and reduce the white turbidity of the obtained hard coat layer.

As the surfactant having an HLB value of more than 8 (C2), a surfactant having an HLB value of 9 to 15, specifically 11 to 14 is preferably used to improve the leveling property of the coating composition.

As the surfactants in the present invention, a mixture of at least one surfactant having an HLB value of 8 or less (C1) and at least one surfactant having an HLB value of more than 8 is used. According to circumstances, a mixture of two or more surfactants (C1) and two or more surfactants (C2) is used.

The total amount of the surfactants (C) in the present invention is preferably 0.001 to 1 part by mass based on 100 parts by mass of the total of the above essential components (the total amount of the inorganic oxide fine particles (A) and the hydrolysable group-containing organic silicon compound (B)). The amount of the component (C) is more preferably 0.05 to 0.8 part by mass, most preferably 0.1 to 0.4 part by mass. The amount of the component (C) is the total amount of the surfactant having an HLB value of 8 or less (C1) and the surfactant having an HLB value of more than 8 (C2). The amount of the component (C1) is preferably not more than 0.5 part by mass, more preferably not more than 0.3 part by mass, most preferably not more than 0.2 part by mass based on 100 parts by mass of the total of the above essential components. The amount of the component (C2) is preferably not more than 0.5 part by mass, more preferably not more than 0.3 part by mass, most preferably not more than 0.2 part by mass based on 100 parts by mass of the total of the above essential components.

Further, the mass ratio (C1)/C2) of the components (C1) and (C2) is in a range of preferably 0.1 to 10.0, more preferably 0.2 to 5.0, most preferably 0.3 to 1.0 to improve the leveling property of the coating composition of the present invention and reduce the white turbidity of the obtained hard coat layer.

The surfactant having an HLB value of 8 or less (C1) can be acquired as a commercial product. Examples of the commercial product include the SF8428 (HLB; 0), SH8400 (HLB; 0), FZ-2110 (HLB; 1), FZ-2122 (HLB; 1), FZ-2203 (HLB; 1), FZ-2207 (HLB; 3), FZ-7001 (HLB; 5), FZ-2166 (HLB; 5), FZ-2191 (HLB; 5), SS-2805 (HLB; 5), SH3749 (HLB; 6), FZ-2120 (HLB; 6), FZ-2154 (HLB; 6), SS-2803 (HLB; 6.5), FZ-2208 (HLB; 7), FZ-2101 (HLB; 7), FZ-2130 (HLB; 7), L-720 (HLB; 7), Y-7006 (HLB; 7), FZ-2104 (HLB; 8), FZ-2164 (HLB; 8), FZ-7002 (HLB; 8) and FZ-2123 (HLB; 8) of Dow Corning Toray Co., Ltd., all of which are polyether modified silicone oils.

The surfactant having an HLB value of more than 8 can be acquired as a commercial product. Examples of the commercial product include the FZ-2101 (HLB; 9), FZ-2105 (HLB; 11), FZ-77 (HLB; 11), FZ-2118 (HLB; 12), FZ-7604 (HLB; 13), FZ-2118 (HLB; 13), FZ-2163 (HLB; 13), SS-2801 (HLB; 13), SS-2802 (HLB; 13), FZ-2104 (HLB; 14), FZ-2162 (HLB; 14), FZ-2162 (HLB; 15), SS-2804 (HLB; 15) and FZ-2161 (HLB; 18) of Dow Corning Toray Co., Ltd., all of which are polyether modified silicone oils.

A description is subsequently given of the other components which can be blended into the coating composition of the present invention, more specifically, a curing catalyst (D), a water-soluble organic solvent (E) and water or an acidic aqueous solution (F). A description is first given of the curing catalyst (D).

<Curing Catalyst (D)>

The curing catalyst (D) in the present invention is used to promote the condensation (polymerization curing) of a hydrolyzed product of the above hydrolysable group-containing organic silicon compound (B). The curing catalyst is selected from acetyl acetonate complexes, perchloric acid salts, organic metal salts and Lewis acids. These curing catalysts may be used alone or in combination of two or more. The coat layer can be made harder by using the curing catalyst.

Examples of the acetyl acetonate complexes include aluminum acetylacetonate, lithium acetylacetonate, indium acetylacetonate, chromium acetylacetonate, nickel acetylacetonate, titanium acetylacetonate, iron acetylacetonate, zinc acetylacetonate, cobalt acetylacetonate, copper acetylacetonate and zirconium acetylacetonate. Out of these, aluminum acetylacetonate and titanium acetylacetonate are preferred.

Examples of the perchloric acid salts include magnesium perchlorate, aluminum perchlorate, zinc perchlorate and ammonium perchlorate.

Examples of the organic metal salts include sodium acetate, zinc naphthenate, cobalt naphthenate and zinc octylate.

Examples of the Lewis acids include stannous chloride, aluminum chloride, ferric chloride, titanium chloride, zinc chloride and antimony chloride.

In the present invention, an acetylacetonate complex or a perchloric acid salt is preferably used as the curing catalyst since a hard coat layer having high scratch resistance is obtained at a relatively low temperature in a short time and the storage stability of the coating composition is excellent. Not less than 50 mass %, specifically not less than 70 mass %, most preferably the total amount of the curing catalyst is an acetylacetonate complex or a perchloric acid salt.

The above curing catalyst is preferably used in an amount of 0.1 to 5 parts by mass, specifically 0.5 to 2 parts by mass based on 100 parts by mass of the total of the above inorganic oxide fine particles (A) and the hydrolysable group-containing organic silicon compound (B) in order to obtain a hard coat layer. The amount of the above curing catalyst is based on the condition that the component (B) is not hydrolyzed.

A description is subsequently given of the water-soluble organic solvent (E).

<Water-Soluble Organic Solvent (E)>

In the present invention, the water-soluble organic solvent (E) is an organic solvent having a solubility in water at 25° C. of not less than 10 mass %, preferably not less than 50 mass %.

The water-soluble organic solvent (E) becomes a solvent for the above hydrolysable group-containing organic silicon compound (B) and a dispersion medium for the above inorganic oxide fine particles (A). Specific examples of the water-soluble organic solvent include alcohols such as methanol, ethanol, propanol, isopropanol, n-butanol, 2-butanol, t-butanol and diacetone alcohol; lower carboxylic acid esters such as methyl acetate; ethers such as dioxane, ethylene glycol monoisopropyl ether, ethylene glycol monomethyl ether, ethylene glycol monoethyl ether, propylene glycol monomethyl ether and propylene glycol monoethyl ether; and ketones such as acetone, methyl ethyl ketone and acetyl acetone. These organic solvents may be used alone or in combination of two or more.

Out of these water-soluble organic solvents (E), methanol, isopropanol, t-butanol, diacetone alcohol, ethylene glycol monoisopropyl ether, propylene glycol monomethyl ether and acetyl acetone are preferably used since they are easily evaporated when the coating agent is applied and cured and a smooth hard coat layer is formed. Part of the water-soluble organic solvent may be mixed with the inorganic oxide fine particles (A) in advance as a dispersion medium for the inorganic oxide fine particles (A) as described above.

The amount of the water-soluble organic solvent (E) is not particularly limited but preferably 50 to 500 parts by mass, more preferably 100 to 250 parts by mass based on 100 parts by mass of the total of the above inorganic oxide fine particles (A) and the hydrolysable group-containing organic silicon compound (B) in order to obtain a good appearance without white turbidity and satisfactory scratch resistance. The amount of the water-soluble organic solvent (E) is based on the condition that the hydrolysable group-containing organic silicon compound (B) is not hydrolyzed and does not include an alcohol produced by the hydrolysis of the hydrolysable group-containing organic silicon compound.

A description is subsequently given of water or the acidic aqueous solution (F).

<Water or Acidic Aqueous Solution (F)>

The above hydrolysable group-containing organic silicon compound (B) in the coating composition of the present invention is hydrolyzed, the obtained hydrolyzed product is polymerization cured (polycondensed) in such a manner that it contains the above inorganic oxide fine particles (A) to form a cured body which becomes a matrix, and a hard coat layer containing the inorganic oxide fine particles (A) densely dispersed in the matrix is formed. To form this coat layer, water or an acidic aqueous solution is preferably used to promote the hydrolysis of the hydrolysable group-containing organic silicon compound (B).

The amount of water or the acidic aqueous solution (F) is 1 to 50 parts by mass, preferably 5 to 30 parts by mass, more preferably 10 to 20 parts by mass based on 100 parts by mass of the total of the above inorganic oxide fine particles (A) and the hydrolysable group-containing organic silicon compound (B). That is, when the amount of water is small, the hydrolysis of the hydrolysable group-containing organic silicon compound (B) does not proceed fully, whereby the scratch resistance of the obtained hard coat layer may lower or the white turbidity of the obtained hard coat film tends to increase, or the characteristic properties such as storage stability of the obtained coating agent may deteriorate. When the amount of water is too large, it is difficult to form a hard coat layer which is uniform in thickness, and the appearance of the hard coat layer may be adversely affected. The amount of water is based on the condition that the hydrolysable group-containing organic silicon compound (B) is not hydrolyzed.

As described previously, the above inorganic oxide fine particles (A) may be used in the form of a dispersion (sol) containing the particles dispersed in water. In this case, the amount of water should be understood to include the amount of water used in this dispersion medium. For example, when the amount of water contained in the dispersion falls within the above range at the time of using the inorganic oxide fine particles (A), it is not necessary to additionally mix water with the coating composition. When the amount of water does not fall within the above range, water should be additionally mixed.

When the acidic aqueous solution is used in the present invention, the hydrolysis of the hydrolysable group-containing organic silicon compound (B) can be promoted. In this case, since the amount of an acid component is small, the amount to be blended is the amount of the acidic aqueous solution. Examples of the acid component include inorganic acids such as hydrochloric acid, sulfuric acid, nitric acid and phosphoric acid, and organic acids such as acetic acid and propionic acid, and an aqueous solution of the above acid may be used. Out of these, hydrochloric acid and acetic acid are preferably used from the viewpoints of the storage stability of the coating composition and hydrolyzability. The concentration of the acidic aqueous solution is preferably 0.001 to 0.5 N, particularly preferably 0.01 to 0.1 N.

A description is subsequently given of additive components except for the above components (A), (B), (C), (D) (E) and (F).

<Other Additive Components>

In the present invention, the following additive components may be used besides the above components as long as the effect of the present invention is not reduced.

A cyclic ketone compound may be added to the coating composition of the present invention to improve and stabilize adhesion between the hard coat layer and the plastic optical substrate. Examples of the cyclic ketone compound include N-methyl pyrrolidone, ε-caprolactam, γ-butyrolactone, 1-vinyl-2-pyrrolidone, isophorone, cyclohexanone and methyl cyclohexanone. The amount of the cyclic ketone compound is preferably 0.1 to 5.0 parts by mass based on 100 parts by mass of the total of the above inorganic oxide fine particles (A) and the hydrolysable group-containing organic silicon compound (B).

As long as the object of the present invention is not inhibited, additives which are generally mixed with a coating composition may be used. Examples of the additives include an antioxidant, radical scavenger, ultraviolet stabilizer, ultraviolet absorbent, release agent, coloring inhibitor, antistatic agent, fluorescent dye, dye, pigment, perfume and plasticizer.

As the antioxidant, radical scavenger, ultraviolet stabilizer and ultraviolet absorbent, hindered phenol antioxidants, phenol-based radical scavengers, sulfur-based antioxidants, benzotriazole-based compounds and benzophenone-based compounds may be preferably used. The amounts of these compounding agents are each preferably 0.1 to 20 parts by mass based on 100 parts by mass of the total of the above essential components (the total of the inorganic oxide fine particles (A) and the hydrolysable group-containing organic silicon compound (B)).

The dye and the pigment are used for coloring, and examples thereof include nitroso dyes, nitro dyes, azo dyes, stilbenzoazo dyes, ketoimine dyes, triphenylmethane dyes, xanthene dyes, acridine dyes, quinoline dyes, methine dyes, polymethine dyes, thiazole dyes, indamine dyes, indophenol dyes, azine dyes, oxazine dyes, thiazine dyes, sulfide dyes, aminoketone dyes, oxyketone dyes, anthraquinone dyes, perinone-based dyes, indigoid dyes, phthalocyanine dyes, azo-based pigments, anthraquinone-based pigments, phthalocyanine-based pigments, naphthalocyanine-based pigments, quinacridone-based pigments, dioxazine-based pigments, indigoid-based pigments, triphenylmethane-based pigments and xanthene-based pigments. Use of the dye or the pigment is suitably determined according to the color density of the substrate to be colored.

In the present invention, a coating agent is produced from the above coating composition, applied to the surface of a plastic optical substrate such as a plastic lens, dried and cured to form a hard coat layer. A description is subsequently given of a method of producing the coating agent by mixing the coating composition comprising the above components.

<Method of Producing Coating Agent>

In the present invention, the coating agent obtained from the above coating composition may be produced by weighting and mixing together predetermined amounts of the above components. The order of mixing the components is not particularly limited and all the components may be mixed together at the same time. However, the following method is preferably employed to achieve the high dispersion stability of the above inorganic oxide fine particles (A) and reduce the white turbidity of the obtained hard coat film.

First, the surfactant having an HLB value of 8 or less (C1), the surfactant having an HLB value of more than 8 (C2) and the hydrolysable group-containing organic silicon compound (B) are weighed, and water or the acidic aqueous solution (F) is added to these. By adding water or the acidic aqueous solution (F), the hydrolysable group-containing organic silicon compound (B) is hydrolyzed. Thereafter, the water-soluble organic solvent (E) is added to and uniformly mixed with the obtained mixture. While the obtained mixture is stirred, the above inorganic oxide fine particles (A) are preferably added to and mixed with the mixture.

When the above curing catalyst (D) is used for the coating agent, preferably, the curing catalyst is added while the above mixture solution is stirred, and then stirring is continued at a temperature of 15 to 30° C. for 5 to 24 hours. Although the reason is not known, when the curing catalyst is used, the pH of the coating composition may be changed by adding the curing catalyst, thereby reducing the dispersion stability of the inorganic oxide fine particles. Therefore, stirring is carried out at a predetermined temperature for a predetermined time to re-disperse the inorganic oxide fine particles, thereby making it possible to improve the dispersion stability. Thereby, the white turbidity of the obtained hard coat layer can be reduced as well.

The coating agent obtained by mixing as described above is not particularly limited but the concentration of a solid component comprising the above component (A) and the hydrolyzed product of the component (B) is preferably 15 to 50 mass %, particularly preferably 20 to 40 mass % based on the total mass of the coating agent.

A description is subsequently given of the plastic optical substrate to which the obtained coating agent is applied.

<Plastic Optical Substrate>

The coating composition of the present invention is used to form a hard coat layer on the surface of a plastic optical substrate such as a spectacle lens, camera lens, liquid crystal display or window for houses and automobiles. It is particularly preferably used for spectacle lenses. The type of a plastic forming the optical substrate may be, for example, a known resin such as (meth)acrylic resin, polycarbonate-based resin, allyl-based resin, thiourethane-based resin, urethane-based resin or thioepoxy-based resin. The coating composition of the present invention can be used to form a hard coat film on the surface of an optical substrate made of any one of these resins. An optical substrate having a hard coat layer with a good appearance and little interference fringe is provided by applying the coating composition of the present invention to the surface of an optical substrate made of a thiourethane-based resin or thioepoxy-based resin having a relatively high refractive index.

The coating agent obtained from the coating composition of the present invention has high adhesion especially to a (meth)acrylic resin. Therefore, it can be advantageously used to form a hard coat layer on an optical substrate made of a (meth)acrylic resin containing a photochromic compound. It is particularly advantageously used to form a hard coat layer on an optical substrate (photochromic optical substrate) made of a (meth)acrylic resin containing a photochromic compound and a hindered amine-based weathering agent which affects the formation of a hard coat layer and having a large number of free spaces. This (meth)acrylic resin having a large number of free spaces is particularly preferably a (meth)acrylic resin obtained by curing a composition comprising a polyfunctional acrylate having a tri- or more functional (meth)acrylate group and a di(meth)acrylate having an alkylene glycol chain with 2 to 15 recurring units.

Examples of the polyfunctional acrylate having a tri- or more functional (meth)acrylate group include trimethylolpropane trimethacrylate, trimethylolpropane triacrylate, tetramethylolmethane trimethacrylate and tetramethylolmethane triacrylate. Examples of the di(meth)acrylate having an alkylene glycol chain with 2 to 15 recurring units include polyethylene glycol dimethacrylate having an average molecular weight of 536, polytetramethylene glycol dimethacrylate having an average molecular weight of 736, polypropylene glycol dimethacrylate having an average molecular weight of 536, polyethylene glycol diacrylate having an average molecular weight of 258, polyethylene glycol diacrylate having an average molecular weight of 308, polyethylene glycol diacrylate having an average molecular weight of 522, 2,2-bis[4-(methacryloxy.polyethoxy)phenyl]propane, 2,2-bis[4-(acryloxy.diethoxy)phenyl]propane and 2,2-bis[4-(acryloxy.polyethoxy)phenyl]propane.

Another polymerizable monomer may be further added to the composition comprising a polyfunctional acrylate having a tri- or more functional (meth)acrylate group and a di(meth)acrylate having an alkylene glycol chain with 2 to 15 recurring units. For example, a (meth)acrylate such as glycidyl methacrylate or urethane acrylate may be added.

The above plastic optical substrate containing a photochromic compound (to be referred to as "photochromic optical substrate" hereinafter) may be an optical substrate containing a photochromic compound dispersed in the substrate or an optical substrate having a photochromic layer containing a photochromic compound dispersed therein on the surface. Stated more specifically, the coating composition of the present invention can be advantageously used to form a hard coat layer on a photochromic optical substrate produced by polymerizing the above curable composition comprising (meth)acrylate-based monomers and a photochromic compound or a photochromic optical substrate produced by applying the above curable composition comprising (meth)acrylate-based monomers and a photochromic compound to the surface of a plastic substrate (having no photochromic properties) and then curing the composition to form a photochromic coat layer. A large amount of the photochromic compound is generally contained in the above photochromic coat layer. Therefore, the photochromic optical substrate having a photochromic coat layer may degrade in weather resistance due to the deterioration of the photochromic compound by long-time use. However, by forming the hard coat layer on the photochromic coat layer by using the coating composition of the present invention, the deterioration of the photochromic compound can be suppressed and the weather resistance of the photochromic optical substrate can be improved as well.

Further, a colored lens is given as an example of the substrate for which the coating composition of the present invention is useful. The coating composition is particularly preferred for colored lenses such as high-refractive index plastic lenses made of a thiourethane-based resin or thioepoxy-based resin. The colored lens generally contains the above dye which is deteriorated by ultraviolet light. Therefore, when the colored lens is used for a long period of time, its color changes. Further, there occurs a problem that adhesion at the interface between the hard coat layer and the plastic lens substrate is greatly reduced by the deterioration of the dye. However, by forming a hard coat layer on the surface of a colored lens by using the coating composition of the present invention, ultraviolet absorption ability is provided with the above inorganic oxide fine particles (A) and the ultraviolet absorbent, thereby making it possible to suppress the above color change and the reduction of adhesion.

As shown in the following examples, colored lenses and photochromic optical substrates are subjected to the deterioration of dyes and photochromic compounds for the above reason. Therefore, in these optical substrates, weather-resistant adhesion at the interface between a hard coat layer and a plastic lens substrate tends to degrade. Therefore, when the optical substrate is used, the difference in weather-resistant adhesion between the coating composition of the present invention and another coating composition becomes remarkable. When a colored lens, that is, a lens containing a dye is used, the above effect becomes remarkable.

A description is subsequently given of a method of producing an optical article having a hard coat layer which is formed on a plastic optical substrate by using the coating agent obtained from the coating composition of the present invention.

<Production Method of Optical Article, Optical Article>

After the coating agent produced as described above is filtered to remove foreign matter as required, it is applied to the surface of a plastic optical substrate such as a plastic lens, dried and cured to form a hard coat layer. The above optical substrate is used as this plastic optical substrate.

To apply the coating agent, a known coating method such as dipping, spin coating, dip spin coating, spraying, brush coating or roller coating may be employed. Drying after the application of the coating agent is carried out under the condition that the solvent contained in the coating agent can be removed. Curing after drying is carried out until the coating layer to be formed has satisfactory strength. Preliminary curing is first carried out at 60 to 80° C. for 5 to 30 minutes to prevent drastic shrinkage and form a hard coat layer having a good appearance, and then curing is carried out at 90 to 120° C. for 1 to 3 hours which differ according to the substrate. Since the coating agent obtained from the coating composition of the present invention exhibits excellent adhesion, the temperature after preliminary curing can be made relatively low. More specifically, the temperature after preliminary curing can be set to 95 to 115° C., further 100 to 110° C. Since curing can be carried out at such a relatively low temperature, the yellowing of a plastic lens or thermal deformation can be prevented.

The hard coat layer formed as described above should have a thickness of 0.1 to 10 μm, preferably 1 to 5 μm for spectacle lenses. By employing the above method, an optical article having the hard coat layer on a plastic optical substrate can be obtained.

The coating composition of the present invention can provide a hard coat layer having excellent scratch resistance and can prevent a poor appearance caused by optical deterioration such as cracking or the peel-off of the hard coat layer even when it is used for a long period of time. Further, the cracking of the hard coat layer derived from heat history at the time of curing, more specifically, the cracking of the hard coat layer caused by the shrinkage of the hard coat layer and the expansion of the plastic optical substrate can also be prevented. The optical article of the present invention has excellent chemical resistance and hot water resistance and can prevent cracking or the degradation of adhesion even when it is brought into contact with a chemical, especially an alkali aqueous solution or hot water.

EXAMPLES

The following examples are provided for the purpose of further illustrating the present invention but are in no way to be taken as limiting. Plastic optical substrates (lens substrates) and components used in Examples are given below.

(1) Plastic Optical Substrate (Lens Substrate)
MRA: thiourethane-based resin plastic lens, refractive index=1.60
MRB: thiourethane-based resin plastic lens, refractive index=1.67
MRC: thiourethane-based resin plastic lens having a luminous transmittance of about 75% and stained brown, refractive index=1.67
TE: thioepoxy-based resin plastic lens, refractive index=1.71
PC1: lens having a coating layer of a methacrylic resin on the surface of MRA plastic lens (photochromic optical substrate)

[Production Method of PC1]

40 parts by mass of 2,2-bis(4-acryloyloxypolyethylene glycolphenyl)propane having an average molecular weight of 776, 15 parts by mass of polyethylene glycol diacrylate (average molecular weight of 532), 25 parts by mass of trimethylolpropane trimethacrylate, 10 parts by mass of polyester oligomer hexaacrylate and 10 parts by mass of glycidyl methacrylate all of which are radical polymerizable monomers were mixed together. 3 parts by mass of the following photochromic compound was added to 100 parts by mass of the resulting mixture of these radical polymerizable monomers to carry out ultrasonic dissolution at 70° C. for 30 minutes. Thereafter, 0.35 part by mass of the Irgacure 1870 (a mixture (weight ratio of 3:7) of 1-hydroxycyclohexylphenyl ketone and bis(2,6-dimethoxybenzoyl)-2,4,4-trimethyl-pentylphosphine oxide) of BASF Japan Limited as a polymerization initiator, 5 parts by mass of bis(1,2,2,6,6-pentamethyl-4-piperidyl)sebacate and 3 parts by mass of triethylene glycol-bis[3-(3-t-butyl-5-methyl-4-hydroxyphenyl) propionate both of which are stabilizers, 7 parts by mass of γ-methacryloyloxypropyl trimethoxysilane as a silane coupling agent and 0.1 part by mass of the L-7001 silicone-based surfactant of Dow Corning Toray Co., Ltd. as a leveling agent were added to and fully mixed with the obtained composition to prepare a photochromic curable composition.

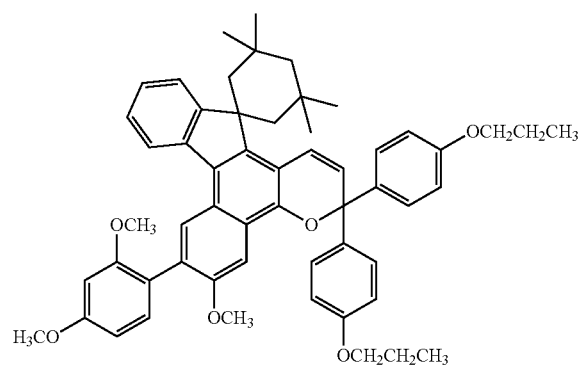

MRA (thiourethane-based resin plastic lens, refractive index=1.60) was used as a plastic optical substrate, fully degreased with acetone, treated with a 50° C. 5% sodium hydroxide aqueous solution for 4 minutes, washed with running water for 4 minutes and then with 40° C. distilled water for 4 minutes, and dried at 70° C. Then, a primer coating liquid containing 50 parts by mass of the TAKESEAL PFR402TP-4 moisture-curable primer of Takebayashi Chemical Industry Co., Ltd. and 50 parts by mass of ethyl acetate was prepared, and 0.03 part by mass of the FZ-2104 leveling agent of Dow Corning Toray Co., Ltd. was added to this mixture liquid and fully stirred in a nitrogen atmosphere until a homogeneous solution was obtained. This primer liquid was applied to the surface of the MRA lens by using the 1H-DX2 spin coater of MIKASA Corporation. This lens was left at room temperature for 15 minutes to produce a lens substrate having a primer layer with a thickness of 7 μm.

Then, about 1 g of the above-described photochromic curable composition was spin coated on the surface of the above lens substrate having a primer layer. The lens coated with a coating film of the above photochromic curable composition was exposed to light for 3 minutes by using the F3000SQ equipped with a D valve of Fusion UV Systems whose output at 405 nm on the lens surface was adjusted to 150 mW/cm$^2$ in a nitrogen gas atmosphere to cure the coating film. Thereafter, the lens substrate was heated at 110° C. in a thermostat for 1 hour to form a photochromic coat layer. The thickness of the obtained photochromic coat layer can be adjusted by spin coating conditions. The thickness of the photochromic coat layer was adjusted to 40±1 μm.

(2) Components of Coating Composition

[Inorganic Oxide Fine Particles (A) Containing at Least One Element Selected from the Group Consisting of Ti, Zr, Sn and Sb]

A1: methanol dispersion sol of composite inorganic oxide fine particles containing 12.0 mass % of tin oxide, 14.3 mass % of zirconium oxide, 12.3 mass % of silicon dioxide and 61.3 mass % of titanium oxide (rutile type), solid concentration (concentration of composite inorganic oxide fine particles) of 30.6 mass %, pH (1+1) 6.5

A2: methanol dispersion sol of composite inorganic oxide fine particles containing 17.7 mass % of tin oxide, 12.7 mass % of zirconium oxide, 15.4 mass % of silicon dioxide and 54.2 mass % of titanium oxide (rutile type), solid concentration (concentration of composite inorganic oxide fine particles) of 30.0 mass %, pH (1+1) 5.0

A3: methanol dispersion sol of composite inorganic oxide fine particles containing 77.6 mass % of tin oxide, 11.7 mass % of zirconium oxide, 7.0 mass % of antimony pentoxide and 3.7 mass % of silicon dioxide, solid concentration (concentration of composite inorganic oxide fine particles) of 30.6 mass %, pH (1+1) 8.3

A4: methanol dispersion sol of composite inorganic oxide fine particles containing 14.2 mass % of tin oxide, 74.6 mass % of zirconium oxide and 11.1 mass % of silicon dioxide, solid concentration (concentration of composite inorganic oxide fine particles) of 38.5 mass %, pH (1+1) 5.0

[Inorganic Oxide Fine Particles Except for (A) of The Present Invention]

A5: methanol dispersion sol of fine particles of silicon dioxide alone, solid concentration (concentration of silicon dioxide fine particles) of 30.0 mass %, pH (1+1) 4.8

[Hydrolysable Group-containing Organic Silicon Compound (B)]
(B1): disilane compound
BSE: 1,2-bis(triethoxysilyl)ethane
BSH: 1,6-bis(triethoxysilyl)hexane
(B2): Epoxy Group-containing Organic Silicon Compound
GTS: γ-glycidoxypropyl trimethoxysilane
GTE: γ-glycidoxypropyl triethoxysilane
(B3): Epoxy Group-containing Organic Silicon Compound
GDS: γ-glycidoxypropylmethyl dimethoxysilane
GDE: γ-glycidoxypropylmethyl diethoxysilane
(B4): Hydrolysable Group-containing Organic Silicon Compound except for (B1), (B2) and (B3)
TEOS: tetraethoxysilane

[SURFACTANT (C)]
(C1) Surfactant Having an HLB Value of 8 or Less
C11: FZ-2110 (HLB; 1)
C12: FZ-2207 (HLB; 3)
C13: FZ-7001 (HLB; 5)
C14: FZ-2166 (HLB; 5)
C15: FZ-2101 (HLB; 7)
C16: FZ-2104 (HLB; 8)
(C2): Surfactant Having an HLB Value of More than 8
C21: FZ-2101 (HLB; 9)
C22: FZ-2105 (HLB; 11)
C23: FZ-7604 (HLB; 13)
C24: FZ-2104 (HLB; 14)
C25: FZ-2162 (HLB; 15)
C26: FZ-2161 (HLB; 18)

[Curing Catalyst (D)]
D1: tris(2,4-pentanedionato)aluminum (III) (acetyl acetonate complex)

[Water-soluble Organic Solvent (E)]
E1: methanol
E2: t-butanol
E3: diacetone alcohol
E4: ethylene glycol isopropyl ether
E5: propylene glycol monomethyl ether
E6: acetyl acetone

[Water or Acidic Aqueous Solution (F)]
F1: 0.05 N hydrochloric acid aqueous solution

[Production of Coating Agent 1]

8.0 parts by mass of BSE as the disilane compound (B1), 6.0 parts by mass of GDS as (B3) and 25.0 parts by mass of GTS as (B2) as the epoxy group-containing organic silicon compounds, 0.10 part by mass of C13 as the surfactant having an HLB value of 8 or less (C1) and 0.14 part by mass of C22 as the surfactant having an HLB value of more than 8 (C2) were weighed and mixed together under agitation. 10.2 g of F1 as water or the acidic aqueous solution (F) was added to the obtained solution under agitation to ensure that the liquid temperature did not exceed 50° C., and stirring was continued for 3 hours after addition. Thereafter, 35.0 parts by mass of E2 and 20.2 parts by mass of E4 as the water-soluble organic solvents (E) were added to and mixed with the resulting solution under agitation.

Then, 83.5 parts by mass of A1 sol as (A) containing at least one element selected from the group consisting of Ti, Zr, Sn and Sb (25.55 parts by mass of composite inorganic oxide fine particles and 57.95 parts by mass of methanol) was added and stirred at room temperature for 3 hours. Thereafter, 0.6 part by mass of D1 as the curing catalyst (D) was added and stirred for 15 hours to obtain a coating composition 1. The end of the hydrolysis of GDS, GTS and BSE was confirmed by gas chromatography.

[Production of Coating Agents 2 to 31]

Coating agents were produced in the same manner as the coating agent 1 except that inorganic oxide fine particles (A), hydrolysable group-containing organic silicon compounds (B), surfactants (C), curing catalysts (D), water-soluble organic solvents (E) and water or acidic aqueous solutions (F) shown in Table 1 and Table 2 were used. The compositions of these agents are shown in Table 1 and Table 2. The coating agents 28 to 31 correspond to Comparative Examples.

TABLE 1

| Coating agent | Component A pbm* | Component B B1 pbm* | B2 pbm* | B3 pbm* | B4 pbm* | Component C C1 pbm* | C2 pbm* | Component D pbm* | Component E pbm* | Component F pbm* |
|---|---|---|---|---|---|---|---|---|---|---|
| 1 | A1 25.55 | BSE 8.0 | GTS 25.0 | GDS 6.0 | — | C13 0.10 | C22 0.14 | D1 0.6 | E1/E2/E4 57.95/35.0/20.2 | F1 10.2 |
| 2 | A2 25.05 | BSE 8.0 | GTS 25.0 | GDS 6.0 | — | C13 0.10 | C22 0.14 | D1 0.6 | E1/E2/E4 58.45/35.0/20.2 | F1 10.2 |
| 3 | A3 25.05 | BSE 8.0 | GTS 25.0 | GDS 6.0 | — | C13 0.10 | C22 0.14 | D1 0.6 | E1/E2/E4 58.45/35.0/20.2 | F1 10.2 |
| 4 | A4 25.1 | BSE 8.0 | GTS 25.0 | GDS 6.0 | — | C13 0.10 | C22 0.14 | D1 0.6 | E1/E2/E4 40.1/35.0/20.2 | F1 10.2 |
| 5 | A1 15.0 | BSE 8.0 | GTS 25.0 | GDS 6.0 | — | C13 0.10 | C22 0.14 | D1 0.6 | E1/E2/E4 34.0/35.0/20.2 | F1 10.2 |
| 6 | A1 50 | BSE 8.0 | GTS 25.0 | GDS 6.0 | — | C13 0.10 | C22 0.14 | D1 0.6 | E1/E2/E4 113.4/35.0/20.2 | F1 10.2 |
| 7 | A1 25.55 | BSE 3.0 | GTS 25.0 | GDS 6.0 | — | C13 0.10 | C22 0.14 | D1 0.6 | E1/E2/E4 57.95/35.0/20.2 | F1 10.2 |
| 8 | A1 25.55 | BSE 15.0 | GTS 25.0 | GDS 6.0 | — | C13 0.10 | C22 0.14 | D1 0.6 | E1/E2/E4 57.95/35.0/20.2 | F1 10.2 |
| 9 | A1 25.55 | BSE 8.0 | GTS 25.0 | GDS 6.0 | — | C13 0.15 | C22 0.14 | D1 0.6 | E1/E2/E4 57.95/35.0/20.2 | F1 10.2 |
| 10 | A1 25.55 | BSE 8.0 | GTS 25.0 | GDS 6.0 | — | C13 0.20 | C22 0.14 | D1 0.6 | E1/E2/E4 57.95/35.0/20.2 | F1 10.2 |
| 11 | A1 25.55 | BSE 8.0 | GTS 25.0 | GDS 6.0 | — | C11 0.05 | C26 0.07 | D1 0.6 | E1/E2/E4 57.95/35.0/20.2 | F1 10.2 |
| 12 | A1 25.55 | BSE 8.0 | GTS 25.0 | GDE 7.1 | — | C12 0.05 | C21 0.07 | D1 0.6 | E1/E2/E4 57.95/35.0/20.2 | F1 10.2 |
| 13 | A1 25.55 | BSE 8.0 | GTE 29.4 | GDS 6.0 | — | C14 0.05 | C23 0.07 | D1 0.6 | E1/E2/E4 57.95/35.0/20.2 | F1 10.2 |
| 14 | A1 25.55 | BSE 9.3 | GTS 25.0 | GDS 6.0 | — | C15 0.05 | C25 0.07 | D1 0.6 | E1/E2/E4 57.95/35.0/20.2 | F1 10.2 |
| 15 | A1 25.55 | BSE 8.0 | GTS 25.0 | GDS 6.0 | — | C16 0.05 | C24 0.07 | D1 0.6 | E1/E2/E4 57.95/35.0/20.2 | F1 10.2 |

*pbm: parts by mass

TABLE 2

| Coating agent | Component A pbm* | Component B B1 pbm* | B2 pbm* | B3 pbm* | B4 pbm* | Component C C1 pbm* | C2 pbm* | Component D pbm* | Component E pbm* | Component F pbm* |
|---|---|---|---|---|---|---|---|---|---|---|
| 16 | A2 25.05 | BSE 8.0 | GTS 25.0 | GDS 6.0 | — | C13 0.05 | C23 0.07 | D1 0.6 | E1/E2/E5 58.45/35.0/20.2 | F1 10.2 |
| 17 | A2 25.05 | BSE 8.0 | GTS 25.0 | GDS 6.0 | — | C13 0.10 | C23 0.03 | D1 0.6 | E1/E2/E5 58.45/35.0/20.2 | F1 10.2 |
| 18 | A2 25.05 | BSE 8.0 | GTS 25.0 | GDS 6.0 | — | C13 0.15 | C23 0.02 | D1 0.6 | E1/E2/E5 58.45/35.0/20.2 | F1 10.2 |
| 19 | A2 25.05 | BSE 8.0 | GTS 25.0 | GDS 6.0 | — | C13 0.05 | C23 0.07 | D1 1.5 | E1/E2/E5 58.45/35.0/20.2 | F1 10.2 |
| 20 | A2 25.05 | BSE 8.0 | GTS 25.0 | GDS 6.0 | — | C13 0.05 | C23 0.07 | D1 0.3 | E1/E2/E5 58.45/35.0/20.2 | F1 10.2 |
| 21 | A2 25.05 | BSE 8.0 | GTS 25.0 | GDS 6.0 | — | C13 0.05 | C23 0.07 | D1 0.6 | E1 58.45 | F1 10.2 |
| 22 | A2 25.05 | BSE 8.0 | GTS 25.0 | GDS 6.0 | — | C13 0.05 | C23 0.07 | D1 0.6 | E1/E2/E3/E6 58.45/35.0/30.0/45.0 | F1 10.2 |
| 23 | A2 25.05 | BSE 8.0 | GTS 25.0 | GDS 6.0 | — | C13 0.05 | C23 0.07 | D1 0.6 | E1/E2/E5 58.45/35.0/20.2 | F1 20 |
| 24 | A2 25.05 | BSE 8.0 | GTS 25.0 | GDS 6.0 | — | C13 0.05 | C23 0.07 | D1 0.6 | E1/E2/E5 58.45/35.0/20.2 | F1 15 |
| 25 | A2 25.05 | BSE 8.0 | GTS 25.0 | GDS 6.0 | — | C13 0.05 | C23 0.07 | D1 0.6 | E1/E2/E5 58.45/35.0/20.2 | F1 5 |
| 26 | A2 25.05 | BSE 8.0 | GTS 25.0 | GDS 6.0 | — | C13 0.05 | C23 0.07 | D1 0.6 | E1/E2/E5 58.45/35.0/20.2 | F1 3 |
| 27 | A1 25.55 | BSE 8.0 | GTS 25.0 | — | TEOS 2.6 | C13 0.10 | C22 0.14 | D1 0.6 | E1/E2/E4 57.95/35.0/20.2 | F1 10.2 |
| 28 | A1 25.55 | BSE 8.0 | GTS 25.0 | GDS 6.0 | — | — | — | D1 0.6 | E1/E2/E4 57.95/35.0/20.2 | F1 10.2 |

TABLE 2-continued

| Coating agent | Component A pbm* | Component B | | | | Component C | | Component D pbm* | Component E pbm* | Component F pbm* |
|---|---|---|---|---|---|---|---|---|---|---|
| | | B1 pbm* | B2 pbm* | B3 pbm* | B4 pbm* | C1 pbm* | C2 pbm* | | | |
| 29 | A1 25.55 | BSE 8.0 | GTS 25.0 | GDS 6.0 | — | C13 0.24 | — | D1 0.6 | E1/E2/E4 57.95/35.0/20.2 | F1 10.2 |
| 30 | A1 25.55 | BSE 8.0 | GTS 25.0 | GDS 6.0 | — | — | C22 0.24 | D1 0.6 | E1/E2/E4 57.95/35.0/20.2 | F1 10.2 |
| 31 | A5 25.05 | BSE 8.0 | GTS 25.0 | GDS 6.0 | — | C13 0.10 | C22 0.14 | D1 0.6 | E1/E2/E4 58.45/35.0/20.2 | F1 10.2 |

*pbm: parts by mass

Example 1

The MRA optical substrate (lens substrate) having a thickness of about 2 mm was immersed in a 50° C. 10 mass % sodium hydroxide aqueous solution to carry out alkali etching for 5 minutes by using an ultrasonic cleaner. After alkali etching, the optical substrate was washed with tap water and with 50° C. distilled water to remove a remaining alkali matter and left for about 10 minutes until its temperature became room temperature. This lens substrate was dip coated with the coating agent 1 at 25° C. and a pulling speed of 15 cm/min. Thereafter, it was pre-cured in a 70° C. oven for 15 minutes and cured at 110° C. for 2 hours to obtain an optical article (hard coat lens) having a 2.1 μm-thick hard coat layer on both sides of the MRA optical substrate (lens substrate). The refractive index of the hard coat layer was 1.65.

[Evaluation Results of Optical Article]

When this optical article (hard coat lens) was evaluated for white turbidity, appearance, alkali resistance test, hot water resistance test, steel wool scratch resistance and weather-resistant adhesion, the white turbidity (Δhaze) was 0.08, the appearance was A, the alkali resistance test result was an alkali concentration of 1.0 wt %, the hot water resistance was 3 hours, the steel wool scratch resistance was A, and the weather-resistant adhesion was 400 hours or more. These results are shown in Table 3. These evaluations were made by the following methods.

(White Turbidity)

The haze value of a plastic lens having a hard coat layer and the haze value of a plastic lens before coating were measured by using the NDH5000 haze meter of Nippon Denshoku Industries Co., Ltd. to evaluate the white turbidity of the plastic lens by Δhaze which is the difference between them.

(Appearance)

Liquid accumulation in a lower part of a lens and cissing seen in a contact part between the lens and a lens holding jig both of which occur when a plastic lens is dip coated with a coating solution were evaluated visually. The lens holding jig was a 3-point fixing jig having holding portions for right and left sides of the most lower end of the lens and one holding portion for an upper part. The evaluation criteria are given below.

A: liquid accumulation and cissing are rarely seen
B: liquid accumulation and cissing are seen in area 0.5 mm or less from lens edge
C: liquid accumulation and cissing are seen in area 1.0 mm or less from lens edge
D: liquid accumulation and cissing are seen in area 1.5 mm or less from lens edge
E: liquid accumulation and cissing are seen in area more than 1.5 mm from lens edge (Alkali Resistance Test)

The obtained optical article (hard coat lens) was immersed in a 50° C. 0.1 mass % (0.1 wt %) sodium hydroxide aqueous solution and subjected to ultrasonic waves for 5 minutes by using an ultrasonic cleaner. Then, this alkali treated lens was immersed in 50° C. ion exchange water and subjected to ultrasonic waves for 5 minutes by using an ultrasonic cleaner to evaluate the appearance of a hard coat film (cracking and peel-off of the hard coat layer) visually. If the cracking of the hard coat film was not observed, the concentration of sodium hydroxide was increased by 0.1 mass % to carry out the same alkali treatment and ion exchange water treatment until a poor appearance was obtained. The evaluation result shows the concentration of the sodium hydroxide aqueous solution used in the final treatment when cracking was observed. For example, "0.3 wt %" in the table means that cracking or the peel-off of the hard coat film was observed for the first time after the optical article (hard coat lens) was treated with a 0.1 wt % sodium hydroxide aqueous solution, a 0.2 wt % sodium hydroxide aqueous solution and further a 0.3 wt % sodium hydroxide aqueous solution.

(Hot Water Resistance Test)

Five optical articles (hard coat lenses) obtained as described above were put into boiled distilled water to evaluate the existence or nonexistence of a crack in the hard coat lens every 1 hour visually, and the upper limit of the test time was 3 hours. The evaluation result shows a test time when the cracking of at least one of them with hot water was observed. For example, when a crack is produced in 2 hours of the test, the hot water resistance is 2 hours and even when a crack is not observed after 3 hours which is the upper limit of the test time, the hot water resistance is written as 3 hours or more.

(Steel Wool Scratch Resistance)

The surface of the optical article (the surface of the hard coat film) was rubbed back and forth 10 times under a load of 3 kg by using steel wool (Bonstar #0000 of Nippon Steel Wool Co., Ltd.) to evaluate scratch resistance visually. The evaluation criteria are given below.

A: not scratched (no scratch can be seen visually)
B: rarely scratched (1 or more to less than 5 scratches are seen visually)
C: slightly scratched (5 or more to less than 10 scratches are seen visually)
D: scratched (10 or more scratches are seen visually)
E: hard coat layer peels off (Weather-Resistant Adhesion Test)

This test was made on the obtained optical article (hard coat lens) at a radiation intensity of 40 W/m² and a lens surface temperature of 50° C. for a maximum of 400 hours by using the X25 xenon weather meter (2.5 kW xenon arc lamp) of Suga Test Instruments Co., Ltd. As for test evaluation, a cross-cut tape test on adhesion between the hard coat film and the lens was carried out in accordance with JISD-0202 before the test and every 25 hours of the test. That is, cuts were made in the hard coat film with a cutter knife at intervals of about 1 mm to form 100 squares. A cellophane adhesive tape (Cellotape (registered trademark) of Nichiban Co., Ltd.) was firmly attached to the squares, pulled at a stroke and separated from the surface in a 90° direction to count the number of squares remaining on the hard coat film. The evaluation result shows a test time when less than 90 squares remained. For example, "100 hours" means that the number of remaining squares was less than 90 in the cross-cut tape test after 100 hours of promotion. When the number of remaining squares after 400 hours of promotion is 90 or more, the evaluation result is written as "400 hours or more". The above results are shown in Table 3.

Examples 2 to 32

Hard coat lenses having a hard coat layer were manufactured and evaluated in the same manner as in Example 1 except that the coating agents 2 to 27 obtained from compositions shown in Tables 1 and 2 and the optical substrates (lens substrates) were used. The evaluation results are shown in Table 3.

TABLE 3

| Ex. | Coating agent | Lens substrate | Film thickness (μm) | Refractive index | White turbidity (ΔHaze) | Appearance | Alkali resistance | Hot water resistance | Scratch resistance | Weather-resistant adhesion |
|---|---|---|---|---|---|---|---|---|---|---|
| 1 | 1 | MRA | 2.1 | 1.65 | 0.08 | A | 1.0 wt % | 3 hours | A | 400 hours or more |
| 2 | 2 | MRA | 2.2 | 1.65 | 0.08 | A | 1.0 wt % | 3 hours | A | 400 hours or more |
| 3 | 3 | MRA | 2.1 | 1.60 | 0.07 | A | 1.0 wt % | 3 hours | A | 300 hours |
| 4 | 4 | MRA | 2.5 | 1.59 | 0.06 | A | 1.0 wt % | 3 hours | A | 300 hours |
| 5 | 5 | MRA | 2.4 | 1.61 | 0.07 | A | 1.0 wt % | 3 hours | B | 300 hours |
| 6 | 6 | MRA | 2.1 | 1.72 | 0.09 | A | 1.0 wt % | 2 hours | A | 300 hours |
| 7 | 7 | MRA | 2 | 1.65 | 0.08 | A | 0.8 wt % | 2 hours | A | 300 hours |
| 8 | 8 | MRA | 2 | 1.64 | 0.08 | A | 1.0 wt % | 1 hour | B | 300 hours |
| 9 | 9 | MRA | 2.1 | 1.65 | 0.12 | A | 1.0 wt % | 3 hours | A | 400 hours or more |
| 10 | 10 | MRA | 2.1 | 1.65 | 0.15 | A | 1.0 wt % | 3 hours | A | 400 hours or more |
| 11 | 11 | MRA | 2.1 | 1.65 | 0.14 | D | 1.0 wt % | 3 hours | A | 400 hours or more |
| 12 | 12 | MRA | 2.1 | 1.65 | 0.12 | C | 1.0 wt % | 3 hours | A | 400 hours or more |
| 13 | 13 | MRA | 2.1 | 1.65 | 0.08 | A | 1.0 wt % | 3 hours | A | 400 hours or more |
| 14 | 14 | MRA | 2.1 | 1.65 | 0.12 | B | 1.0 wt % | 3 hours | A | 400 hours or more |
| 15 | 15 | MRA | 2.1 | 1.65 | 0.12 | B | 1.0 wt % | 3 hours | A | 400 hours or more |
| 16 | 16 | MRB | 2.1 | 1.65 | 0.08 | A | 1.0 wt % | 3 hours | A | 400 hours or more |
| 17 | 17 | MRB | 2.1 | 1.65 | 0.12 | A | 1.0 wt % | 3 hours | A | 400 hours or more |
| 18 | 18 | MRB | 2.1 | 1.65 | 0.15 | A | 1.0 wt % | 3 hours | A | 400 hours or more |
| 19 | 19 | MRB | 2.1 | 1.65 | 0.08 | A | 1.0 wt % | 2 hours | A | 300 hours |
| 20 | 20 | MRB | 2.1 | 1.65 | 0.08 | A | 1.0 wt % | 2 hours | B | 300 hours |
| 21 | 21 | TE | 2.5 | 1.65 | 0.12 | C | 1.0 wt % | 3 hours | A | 300 hours |
| 22 | 22 | TE | 1.5 | 1.65 | 0.09 | C | 1.0 wt % | 3 hours | A | 300 hours |
| 23 | 23 | TE | 2.3 | 1.65 | 0.12 | D | 1.0 wt % | 3 hours | A | 300 hours |
| 24 | 24 | TE | 2.2 | 1.65 | 0.12 | C | 1.0 wt % | 3 hours | A | 300 hours |
| 25 | 25 | TE | 2.2 | 1.65 | 0.12 | A | 0.8 wt % | 3 hours | B | 250 hours |
| 26 | 26 | TE | 2.2 | 1.65 | 0.15 | A | 0.7 wt % | 2 hours | C | 200 hours |
| 27 | 27 | MRA | 2.1 | 1.65 | 0.08 | A | 1.1 wt % | 3 hours | A | 400 hours or more |
| 28 | 1 | MRC | 2.1 | 1.65 | 0.08 | A | 1.0 wt % | 3 hours | A | 200 hours |
| 29 | 2 | MRC | 2.2 | 1.65 | 0.08 | A | 1.0 wt % | 3 hours | A | 200 hours |
| 30 | 3 | MRC | 2.1 | 1.60 | 0.07 | A | 1. wt % | 3 hours | A | 150 hours |
| 31 | 4 | MRC | 2.5 | 1.59 | 0.06 | A | 1.0 wt % | 3 hours | A | 150 hours |
| 32 | 16 | MRC | 2.1 | 1.65 | 0.08 | A | 1.0 wt % | 3 hours | A | 200 hours |

Ex.: Example

Comparative Examples 1 to 4

Hard coat lenses having a hard coat layer were manufactured and evaluated in the same manner as in Example 1 except that the coating agents 28 to 31 shown in Table 2 and the optical substrate (lens substrate) were used. The evaluation results are shown in Table 4.

TABLE 4

| C. Ex. | Coating agent | Lens substrate | Film thickness (μm) | Refractive index | White turbidity (ΔHaze) | Appearance | Alkali resistance | Hot water resistance | Scratch resistance | Weather-resistant adhesion |
|---|---|---|---|---|---|---|---|---|---|---|
| 1 | 28 | MRA | 2.1 | 1.65 | 0.06 | E | 0.5 wt % | 1 hour | B | 200 hours |
| 2 | 29 | MRA | 2.1 | 1.65 | 0.21 | A | 1.0 wt % | 3 hours | A | 400 hours or more |
| 3 | 30 | MRA | 2.1 | 1.65 | 0.08 | E | 0.8 wt % | 3 hours | A | 400 hours or more |
| 4 | 31 | MRA | 2.2 | 1.49 | 0.08 | A | 0.8 wt % | 3 hours | A | 100 hours |

C. Ex.: Comparative Example

Example 33

The PC1 photochromic optical substrate was immersed in a 50° C. 20 mass % sodium hydroxide aqueous solution to carry out alkali etching for 5 minutes by using an ultrasonic cleaner. After alkali etching, the optical substrate was washed with tap water and with 50° C. distilled water to remove a remaining alkali matter and left for about 10 minutes until its temperature became room temperature. This lens substrate was dip coated with the coating agent 1 at 25° C. and a pulling speed of 15 cm/min. Thereafter, the coating agent was pre-cured in a 70° C. oven for 15 minutes and then cured at 110° C. for 2 hours to obtain an optical article (hard coat lens) having a 2.1 μm-thick hard coat layer on both sides of the PC1 optical substrate (lens substrate).

(Evaluation Results of Optical Article)

When this optical article (hard coat lens) was evaluated for white turbidity, appearance, alkali resistance test, hot water resistance test, steel wool scratch resistance, weather-resistant adhesion and yellowness (ΔYI), the white turbidity (ΔHaze) was 0.08, the appearance was A, the alkali resistance test result was an alkali concentration of 1.0 wt %, the hot water resistance was 3 hours, the steel wool scratch resistance was A, the weather-resistant adhesion was 400 hours or more, and the yellowness (ΔYI) was 1.5. These evaluations were made by the following methods. The results are shown in Table 5.

(Evaluation of Weather Resistance Test ΔYI)

Since an optical substrate (PC1 lens) having a photochromic coat layer contains a large amount of a photochromic compound on the coat layer, it may deteriorate in weather resistance. However, when a hard coat layer is formed on the photochromic coat layer from the coating composition of the present invention, weather resistance can be improved. The evaluation of this weather resistance was carried out by the following method.

A lens (PC1 lens) having a photochromic coat layer as a sample was exposed to light for 100 hours at a radiation intensity of 40 W/m$^2$ and a lens surface temperature of 50° C. by using the X25 xenon weather meter (2.5 kW xenon arc lamp) of Sugar Test Instruments Co., Ltd. to carry out accelerated degradation.

Then, YI ($YI_0$) before accelerated degradation and YI ($YI_{100}$) after accelerated degradation were measured by using the SM color computer (SM-T) of Suga Test Instruments Co., Ltd. to obtain yellowness from the following equation so as to evaluate yellowness.

$$\text{Yellowness } (\Delta YI) = YI_{100} - YI_0$$

As this yellowness (ΔYI) is smaller, the yellowness of the lens after degradation becomes smaller and the weather resistance becomes higher. The result is shown in Table 5.

Examples 34 to 37, Comparative Examples 5 to 8

Plastic lenses having a hard coat layer were manufactured and evaluated in the same manner as in Example 33 except that the coating agents 2 to 4, 16 and 28 to 31 obtained from the compositions shown in Tables 1 and 2 were used. The evaluation results are shown in Table 5.

TABLE 5

| No. | Coating agent | Lens substrate | Film thickNess (μm) | Refractive index | White turbidity (ΔHaze) | Appearance | Alkali resistance | Hot water resistance | Scratch resistance | Weather-resistant adhesion | Yellow-Ness (ΔYI) |
|---|---|---|---|---|---|---|---|---|---|---|---|
| Ex. 33 | 1 | PC1 | 2.1 | 1.65 | 0.08 | A | 1.0 wt % | 3 hours | A | 400 hours or more | 1.5 |
| Ex. 34 | 2 | PC1 | 2.2 | 1.65 | 0.08 | A | 1.0 wt % | 3 hours | A | 400 hours or more | 1.5 |
| Ex. 35 | 3 | PC1 | 2.1 | 1.6 | 0.07 | A | 1.0 wt % | 3 hours | A | 300 hours | 2.5 |
| Ex. 36 | 4 | PC1 | 2.5 | 1.59 | 0.06 | A | 1.0 wt % | 3 hours | A | 300 hours | 2.6 |
| Ex. 37 | 16 | PC1 | 2.1 | 1.65 | 0.08 | A | 1.0 wt % | 3 hours | A | 400 hours or more | 1.4 |
| C. Ex. 5 | 28 | PC1 | 2.1 | 1.65 | 0.07 | E | 0.5 wt % | 1 hour | B | 150 hours | 1.6 |
| C. Ex. 6 | 29 | PC1 | 2.1 | 1.65 | 0.23 | A | 1.0 wt % | 3 hours | A | 400 hours or more | 1.6 |

TABLE 5-continued

| No. | Coating agent | Lens substrate | Film thickNess (μm) | Refractive index | White turbidity (⊿Haze) | Appearance | Alkali resistance | Hot water resistance | Scratch resistance | Weather-resistant adhesion | Yellow-Ness (⊿YI) |
|---|---|---|---|---|---|---|---|---|---|---|---|
| C. Ex. 7 | 30 | PC1 | 2.1 | 1.65 | 0.09 | E | 0.8 wt % | 3 hours | A | 400 hours or more | 1.5 |
| C. Ex. 8 | 31 | PC1 | 2.2 | 1.49 | 0.08 | A | 0.8 wt % | 3 hours | A | 100 hours | 5.2 |

Ex. Example,
C. Ex.: comparative Example

As obvious from the above Examples, a hard coat layer having little while turbidity, a good appearance and excellent alkali resistance, hot water resistance, scratch resistance and weather-resistant adhesion could be formed by mixing together the inorganic oxide fine particles (A), the hydrolysable group-containing organic silicon compound (B) and the surfactants (C) of the present invention. In contrast to this, in Comparative Examples 1 to 4, at least one of the requirements for white turbidity, appearance, alkali resistance, hot water resistance, scratch resistance and weather-resistant adhesion could not be satisfied because the compositions were not preferred.

Further, even when a photochromic optical substrate having a photochromic coat layer on the surface of a plastic optical substrate was used, all the requirements for white turbidity, appearance, alkali resistance, hot water resistance and weather-resistant adhesion were satisfied and the yellowness of the lens after the weather resistance test could be reduced.

Effect of the Invention

The coating composition of the present invention is characterized in that a coating composition comprising inorganic oxide fine particles containing at least one element selected from the group consisting of Ti, Zr, Sn and Sb and a hydrolysable group-containing organic silicon compound is further mixed with a surfactant having an HLB value of 8 or less and a surfactant having an HLB value of more than 8. By mixing these components, a hard coat layer having little white turbidity and excellent adhesion to a plastic optical substrate and high weather resistance can be formed without causing a poor appearance such as a crack even when it is used for a long period of time. Further, a hard coat layer having high chemical resistance and hot water resistance can be formed, and cracking caused by heat history at the time of forming a coat layer can be suppressed as well.

Therefore, since the hard coat layer has no poor appearance when the coating composition of the present invention is used, the service life of an optical article such as a plastic lens can be dramatically extended.

The invention claimed is:

1. A coating composition comprising (A) inorganic oxide fine particles containing at least one element selected from the group consisting of Ti, Zr, Sn and Sb, (B) a hydrolysable group-containing organic silicon compound, and (C1) a surfactant having an HLB value of 8 or less and (C2) a surfactant having an HLB value of more than 8 as (C) surfactants, wherein the mass ratio (C1/C2) of the surfactant having an HLB value of 8 or less (C1) and the surfactant having an HLB value of more than 8 (C2) is 0.3 to 1.0.

2. The coating composition according to claim 1, wherein the contents of the surfactant having an HLB value of 8 or less (C1) and the surfactant having an HLB value of more than 8 (C2) are each not more than 0.5 part by mass and the total content of the components (C1) and (C2) is 0.001 to 1 part by mass based on 100 parts by mass of the total of the inorganic oxide fine particles (A) and the hydrolysable group-containing organic silicon compound (B).

3. The coating composition according to claim 1, wherein the inorganic oxide fine particles (A) comprise titanium oxide having a rutile type crystal structure.

4. The coating composition according to claim 1, wherein the hydrolysable group-containing organic silicon compound (B) comprises (B1) a disilane compound represented by the following formula (1):

(1)

wherein, $R^1$ is a methyl group or ethyl group, and X is an alkylene group having 2 to 3 carbon atoms.

5. The coating composition according to claim 1, wherein the hydrolysable group-containing organic silicon compound (B) further comprises (B2) an epoxy group-containing organic silicon compound represented by the following formula (2) in an amount of 2.5 to 20 moles based on 1 mole of the disilane compound (B1)

$(R^2)Si(OR^3)_3$ (2)

wherein, $R^2$ is represented by the following formula (3):

(3)

wherein, $R^4$ is an alkylene group having 1 to 8 carbon atoms or a group represented by the following formula (4):

(4)

wherein, $R^5$ is an alkylene group having 1 to 8 carbon atoms
and $R^3$'s are each an alkyl group having 1 to 3 carbon atoms and may be the same or different.

6. The coating composition according to claim 1, further comprising 0.1 to 5.0 parts by mass of (D) a curing catalyst, 50 to 500 parts by mass of (E) a water-soluble organic solvent and 1 to 50 parts by mass of (F) water or an acid aqueous solution based on 100 parts by mass of the total of the inorganic oxide fine particles (A) and the hydrolysable group-containing organic silicon compound (B).

7. An optical article having a hard coat layer which is a cured product of the coating composition of claim 1 on a plastic optical substrate containing sulfur.

8. The optical article according to claim 7, wherein the plastic optical substrate is a photochromic optical substrate.

9. The optical article according to claim 8, wherein the photochromic optical substrate has a photochromic coat layer which is a cured product of a polymerization curable composition comprising polymerizable monomers and a photochromic compound on a plastic optical substrate which is not photochromic.

10. The optical article according to claim 7, wherein the plastic optical substrate is an optical substrate containing a dye.

11. The coating composition according to claim 2, wherein the inorganic oxide fine particles (A) comprise titanium oxide having a rutile type crystal structure.

12. The coating composition according to claim 2, wherein the hydrolysable group-containing organic silicon compound (B) comprises(B1) a disilane compound represented by the following formula (1):

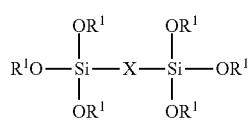

(1)

wherein, $R^1$ is a methyl group or ethyl group, and X is an alkylene group having 2 to 3 carbon atoms.

13. The coating composition according to claim 3, wherein the hydrolysable group-containing organic silicon compound (B) comprises(B1) a disilane compound represented by the following formula (1):

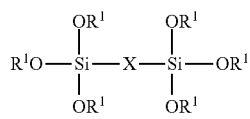

(1)

wherein, $R^1$ is a methyl group or ethyl group, and X is an alkylene group having 2 to 3 carbon atoms.

14. The coating composition according to claim 2, wherein the hydrolysable group-containing organic silicon compound (B) further comprises (B2) an epoxy group-containing organic silicon compound represented by the following formula (2) in an amount of 2.5 to 20 moles based on 1 mole of the disilane compound (B1)

$$(R^2)Si(OR^3)_3 \quad (2)$$

wherein, $R^2$ is represented by the following formula (3):

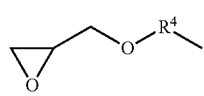

(3)

wherein, $R^4$ is an alkylene group having 1 to 8 carbon atoms or a group represented by the following formula (4):

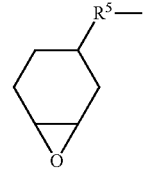

(4)

wherein, $R^5$ is an alkylene group having 1 to 8 carbon atoms and $R^3$'s are each an alkyl group having 1 to 3 carbon atoms and may be the same or different.

15. The coating composition according to claim 3, wherein the hydrolysable group-containing organic silicon compound (B) further comprises (B2) an epoxy group-containing organic silicon compound represented by the following formula (2) in an amount of 2.5 to 20 moles based on 1 mole of the disilane compound (B1)

$$(R^2)Si(OR^3)_3 \quad (2)$$

wherein, $R^2$ is represented by the following formula (3):

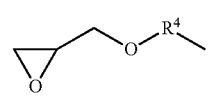

(3)

wherein, $R^4$ is an alkylene group having 1 to 8 carbon atoms or a group represented by the following formula (4):

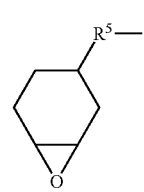

(4)

wherein, $R^5$ is an alkylene group having 1 to 8 carbon atoms and $R^3$'s are each an alkyl group having 1 to 3 carbon atoms and may be the same or different.

16. The coating composition according to claim 4, wherein the hydrolysable group-containing organic silicon compound (B) further comprises (B2) an epoxy group-containing organic silicon compound represented by the following formula (2) in an amount of 2.5 to 20 moles based on 1 mole of the disilane compound (B1)

$$(R^2)Si(OR^3)_3 \quad (2)$$

wherein, $R^2$ is represented by the following formula (3):

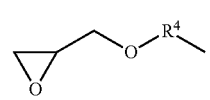

(3)

wherein, $R^4$ is an alkylene group having 1 to 8 carbon atoms or a group represented by the following formula (4):

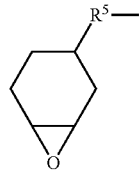
(4)

wherein, $R^5$ is an alkylene group having 1 to 8 carbon atoms and $R^3$'s are each an alkyl group having 1 to 3 carbon atoms and may be the same or different.

17. The coating composition according to claim 2, further comprising 0.1 to 5.0 parts by mass of (D) a curing catalyst, 50 to 500 parts by mass of (E) a water-soluble organic solvent and 1 to 50 parts by mass of (F) water or an acid aqueous solution based on 100 parts by mass of the total of the inorganic oxide fine particles (A) and the hydrolysable group-containing organic silicon compound (B).

18. The coating composition according to claim 3, further comprising 0.1 to 5.0 parts by mass of (D) a curing catalyst, 50 to 500 parts by mass of (E) a water-soluble organic solvent and 1 to 50 parts by mass of (F) water or an acid aqueous solution based on 100 parts by mass of the total of the inorganic oxide fine particles (A) and the hydrolysable group-containing organic silicon compound (B).

19. The coating composition according to claim 4, further comprising 0.1 to 5.0 parts by mass of (D) a curing catalyst, 50 to 500 parts by mass of (E) a water-soluble organic solvent and 1 to 50 parts by mass of (F) water or an acid aqueous solution based on 100 parts by mass of the total of the inorganic oxide fine particles (A) and the hydrolysable group-containing organic silicon compound (B).

20. The coating composition according to claim 5, further comprising 0.1 to 5.0 parts by mass of (D) a curing catalyst, 50 to 500 parts by mass of (E) a water-soluble organic solvent and 1 to 50 parts by mass of (F) water or an acid aqueous solution based on 100 parts by mass of the total of the inorganic oxide fine particles (A) and the hydrolysable group-containing organic silicon compound (B).

* * * * *